United States Patent [19]
Isenberg

[11] Patent Number: 5,761,675
[45] Date of Patent: Jun. 2, 1998

[54] DIAGNOSIS AND REPAIR OF DEFECTIVE LONG FILENAMES

[75] Inventor: Henri Isenberg, Los Angeles, Calif.

[73] Assignee: Symantec Corporation, Cupertino, Calif.

[21] Appl. No.: 618,188

[22] Filed: Mar. 19, 1996

[51] Int. Cl.[6] .................. G06F 17/30; G06F 7/08; G06F 7/24
[52] U.S. Cl. ............................ 707/200; 707/101
[58] Field of Search .................. 395/612, 616, 395/500

[56] References Cited

U.S. PATENT DOCUMENTS 5,579,517 11/1996 Reynolds et al. ............... 395/616

OTHER PUBLICATIONS

Prosisc, Jeff, "How Windows 95 Stores Long Filenames", Jun. 25, 1996, pp. 1–5, V 15, N 12, p. 217.
Rubenking, Neil J., "User to User. (PC Solutions)", Mar. 12, 1996, V 15, N 5 p.277 (2).
Symantec Corporation, *Norton Utilities for Windows 95 User's Guide*, 1995, pp. 3–14 through 3–20, U.S.A.

Primary Examiner—Robert W. Beausoliel, Jr.
Assistant Examiner—P. Vales
Attorney, Agent, or Firm—Fenwick & West LLP

[57] ABSTRACT

Defective long filenames (LFNS) are diagnosed and repaired in computer systems that have a file allocation table (FAT) structure (2) and that use both short filenames (SFNs) and long filenames (LFNs). Each LFN comprises at least one LFN entry. Defective LFN entries that are repaired are from the group comprising orphaned LFN entries, malformed LFN entries, improperly terminated chains of LFN entries, and improper matches between LFNs and corresponding SFNs.

14 Claims, 4 Drawing Sheets

FIG.1

| Name | .Ext | ID | Size | Date | Time | Cluster | 76 | A | R | S | H | D | V |
|------|------|-----|-------|---------|----------|---------|----|---|---|---|---|---|---|
| IO | DOS | File | 40566 | 9-30-93 | 6:20 am | | 2 | A | R | S | H | – | – |
| MSDOS | DOS | File | 38138 | 9-30-93 | 6:20 am | | 4 | A | R | S | H | – | – |
| COMMAND | DOS | File | 54619 | 9-30-93 | 6:20 am | | 6 | A | R | – | – | – | – |
| IDE 1 GB | | Vol | 0 | 4-26-95 | 7:34 pm | | 0 | A | – | – | – | V | – |
| DOS | | Dir | 0 | 4-19-95 | 10:37 pm | | 9 | – | – | – | – | – | D |

0-7 / 8-10 / 11 / 26-27 / 22-23 / 24-25 / 28-31

Byte position

| NT | Create Date | Create Time | Accessed | E.A. |
|----|-------------|-------------|----------|------|
| 0 | 0-00-80 | 12:00.000 am | 5-31-95 | 0 |
| 0 | 0-00-80 | 12:00.000 am | 5-31-95 | 0 |
| 0 | 0-00-80 | 12:00.000 am | 5-31-95 | 0 |
| 0 | 4-26-95 | 7:34.192 pm | 4-26-95 | 0 |
| 0 | 0-00-80 | 12:00.000 am | 0-00-80 | 0 |

| Ordinal Field | Filename Characters 1-5 | File attributes 7 6 A R S H V D | Type | Checksum | Filename Characters 6-11 | Starting cluster | Filename Characters 12-13 |
|---|---|---|---|---|---|---|---|
| 43h | ame.Txt | - - - R S H V - | 0 | 66 | ng fil | 0 | en |
| 02h | ry lo | - - - R S H V - | 0 | 66 | is my | 0 | ve |
| 01h | This | - - - R S H V - | | | | | |
| 0 | 1-10 | 11 | 12 | 13 | 14-25 | 26-27 | 28-31 |

Byte position

FIG. 3

| Filename | File attributes 7 6 A R S H V D | Starting cluster | File size |
|---|---|---|---|
| me.Txt | - - - R S H V - | 0 | 0 |
| ry long filena | - - - R S H V - | 0 | 0 |
| This is my ve | - - - R S H V - | 0 | 0 |
| THISIS~1.TXT | - - - - A - - - | 2122 | 150 |

LFN entries
Short name

DIAGNOSIS AND REPAIR OF DEFECTIVE LONG FILENAMES

DESCRIPTION

1. Technical Field

This invention pertains to the field of diagnosing and repairing defective long filenames (LFNs) in computer systems that have a file allocation table (FAT) structure and that use both short filenames (SFNs) and long filenames (LFNs).

2. Background Art

Since this technical field is new, there are no known publications relevant to the problem solved by this invention.

DISCLOSURE OF INVENTION

The present invention is a computer apparatus and method for diagnosing and repairing defective long filenames (LFNs). A computer storage medium (2) contains at least one directory. Each directory may contain at least one entry representing a file. A short filename (SFN) is assigned to each file. There may be a long filename (LFN) assigned to at least one of the files. An LFN comprises at least one LFN entry. The present invention diagnoses defective LFN entries (18, 20, 28, 36, 32, 40); and repairs LFN entries that have been diagnosed as being defective (24, 22, 30, 38, 34, 42).

BRIEF DESCRIPTION OF THE DRAWINGS

These and other more detailed and specific objects and features of the present invention are more fully disclosed in the following specification, reference being had to the accompanying drawings, in which:

FIG. 1 is an illustration of a set of directory entries showing file, subdirectory, and volume labels, as used in the present invention.

FIG. 2 is an illustration of a set of long filename (LFN) directory entries, as used in the present invention.

FIG. 3 is an illustration of simplified directory entries for a long filename, showing how long filename entries are associated with a short filename entry.

DETAILED DESCRIPTION OF THE PREFERRED EMBODIMENTS

Figure 4:
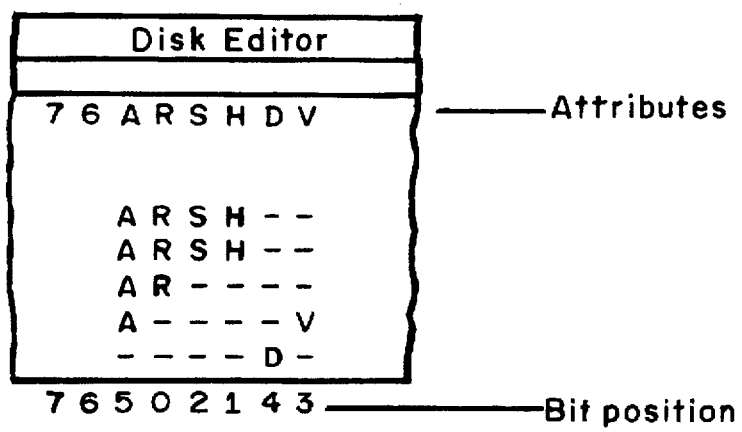
FIG. 4 is an illustration of file attributes as used in the present invention.

The present invention can be used in conjunction with any computer operating system that has a file allocation table (FAT) structure and that uses both short filenames and long filenames. Examples of such operating systems include Windows 95, Windows NT, and MS DOS 7.0, all manufactured by Microsoft Corporation of Redmond, Wash. The present specification describes the invention as being used in conjunction with Windows 95, for purposes of illustration only.

Before the release of Windows 95, all directory entries in operating systems manufactured by Microsoft Corporation used what is now known as the short name format. Three types of directory entries use this format: file, subdirectory, and volume label. FIG. 1 provides an example of each of these types of directory entries.

Every directory entry is exactly 32 bytes long. Note that the fields are displayed in FIG. 1 in a different order than the sequential order in which they are arranged in the directories residing on the storage medium 2. The following table gives a brief summary of the directory entry fields displayed in FIG. 1.

| Byte Position | Field Name | Description |
| --- | --- | --- |
| 0–7 | Filename | Name given to the entry. |
| 8–10 | File extension | File type identifier. Examples of common file extensions are TXT, DOC, and EXE. |
| 11 | File attributes | Special properties of the entry, as explained below. |
| 12 | NT attribute | Reserved for use by Windows NT. |
| 13 | Creation time (msec) | Milliseconds after the minute the entry was created. This field is combined with the one at bytes 14 and 15 to provide a higher time resolution. |
| 14–15 | Creation time | Time the entry was created. This field is accurate to the minute. |
| 16–17 | Creation date | Date the file was created. |
| 18–19 | Last access date | Date that the file was last accessed, either for reading or for writing. |
| 20–21 | Extended attribute | OS/2 field that points to other information about files, such as their icons and configuration information. Also called the EA handle, this field provides compatibility with the OS/2 operating system (manufactured by IBM Corporation). |
| 22–23 | Modified time | Time that the file was last modified. |
| 24–25 | Modified date | Date that the file was last modified. |
| 26–27 | Starting cluster | For a file or subdirectory, the first cluster in the FAT chain. When retrieving a file or subdirectory, the operating system must first find this cluster so that the FAT chain for the file can be traversed. |
| 28–31 | File size | Number of bytes contained in the file. |

Before the introduction of Windows 95, the naming conventions for Mircosoft's DOS and Windows files were very restrictive. A filename had to follow the "8.3 (eight-dot-three) format"—that is, it could have a maximum of eight characters optionally followed by a file extension of up to three characters. A period separates the two parts.

Under Windows 95, long filenames (LFNs) of up to 260 characters are now possible, and the file extension can be virtually any length. As an extreme example, one could have a single-character filename followed by a period, and then a 258-character extension. A long filename can contain more than one period; in this case, everything after the last period is considered the file extension.

To support this new capability, the directory entries for LFNs are implemented very differently from the other directory entry types. FIG. 2 shows that three LFN entries are required for a long filename entitled "This is my very long filename.Txt".

As shown in FIG. 2, LFN entries also are 32 bytes long; it's just the interpretation of the bytes that distinguishes a short filename entry (SFN) from an LFN entry. The most important difference between LFN entries and the other types of directory entries is that a single long filename can require multiple LFN entries, since each LFN entry has room for only 13 characters of the filename. The following is a description of the fields for LFN entries:

| Byte Position | Field Name | Description |
|---|---|---|
| 0 | Ordinal field | Hexadecimal number indicating the order of LFN entries in a chain of LFN entries. This field is needed because LFNs may require more than one directory entry. The first entry is numbered 01h, the second 02h, and so forth. The last entry has its seventh bit set to 1. An example of a resulting ordinal (43h) is shown in FIG. 2. |
| 1–10 | Filename characters 1–5 | The first five filename characters within this LFN entry. This field cannot be blank. Ten bytes are needed because the UNICODE character set is used. |
| 11 | File attributes | Special properties of the entry, as explained below. |
| 12 | Type | Reserved for future use. Currently it always contains 0, which denotes an LFN entry. |
| 13 | Checksum | A number verifying that the LFN directory entry is valid. The short name for the file is the basis for this value. The checksum is calculated by the operating system. |
| 14–25 | Filename characters 6–11 | The sixth through eleventh filename characters within this LFN entry. This field may be blank. |
| 26–27 | Cluster number | No longer used; always 0. This field is to maintain backwards compatibility with older versions of DOS and other software. |
| 28–31 | Filename characters 12–13 | The twelfth and thirteenth filename characters within this LFN entry. This field may be blank. |

In addition to requiring one or more directory entries of the LFN type, a long filename must also have a short filename (SFN) directory entry immediately following the LFN entry or chain of LFN entries. If a long filename doesn't have both LFN entries and an SFN entry, there's no way to find the first cluster in the file, because the SFN directory entry is the only place this information is stored. FIG. 3 illustrates the structure of the SFN and LFN directory entries for a long filename. FIG. 3 includes only certain key directory entry fields.

There may not be any LFN entries associated with an SFN entry. This could happen, for example, if the user created or renamed the short name using a pre-Windows 95 application or version of DOS.

The short name is a unique filename based on characters contained in the LFN. In addition to being the LFN's link to a file, the short name allows Windows 3.x and DOS applications to access files having long filenames; those applications simply use the short name.

The LFN illustrated in FIG. 3, "This is my very long filename.Txt", has the short name of THISIS~1.TXT. Windows generates this short name. The ~ and number ensure that no two long files have the same short name. For example, if the user creates another file named "This is my Long Essay.Txt", Windows automatically assigns it a unique short name of THISIS~2.TXT.

Despite the above, however, it sometimes happens that a directory contains duplicate SFN entries or duplicate LFN entries. In that case, the present invention makes a slight modification to one of the duplicate entries, so that they are no longer duplicates.

The text that makes up the LFN is stored in the chain of LFN entries in reverse order. The first LFN directory entry stores the last characters in the filename.

LFNs are case sensitive; short names are not.

Even though LFNs are case sensitive, searching for, moving, opening, or otherwise manipulating files having LFNs is case insensitive. For example, if the user wishes to open a file named "Budget for the First Quarter", the file will still be opened if the user specifies the filename as "budget for the first quarter" or uses any other combination of uppercase and lowercase letters.

An LFN becomes detached from its short name if the user moves a short file or renames the short name using a pre-Windows 95 application or version of DOS. Norton Disk Doctor or Disk Editor (manufactured by Symantec Corporation, Cupertino, Calif.) can be used to simply remove the LFN entries, or to reattach the LFNs to the short name.

LFNs use the UNICODE character set, which requires two bytes for a single character. Short names use the ASCII—also referred to as the Original Equipment Manufacturer (OEM)—character set, which requires one byte per character.

File attributes are a combination of several properties a directory entry can have. When the operating system interprets these properties, it knows whether to treat an entry as a system file, directory, volume label, LFN entry, or SFN entry.

There are a total of six file attributes. Each attribute has a different bit position within the byte allocated for this field. A directory entry "has" a particular attribute if that attribute's bit is 1. FIG. 4 describes each file attribute and its bit position.

X Unused bits
  These bits are always set to 0.
A Archive attribute
  When this bit is 1, the entry has not been archived (backed up).
D Directory attribute
  When this bit is 1, the entry is a subdirectory.
V Volume label attribute
  When this bit is 1, the entry denotes a volume label or LFN.
S System attribute
  When this bit is 1, the entry is a system file.
H Hidden attribute
  When this bit is 1, the entry is not included in directory listings (such as what appears in the file pane of the Windows Explorer or when the DIR command is issued from the DOS prompt). In both cases, however, the user has the option of overriding the exclusion of hidden entries.
R Read-only attribute
  When this bit is 1, the entry cannot be overwritten, deleted, or moved.

Notice that there is no attribute to indicate an entry is a file. Files are simply entries where neither the directory nor volume label bit is set. LFNs are also a special case. FIG. 3 shows that the LFN directory entries all have their volume label, system, hidden, and read-only attributes set. Because this combination of attributes is illogical (these entries are not volume labels), it would presumably never be set by other software. The present invention uses this particular attribute combination to flag directory entries as belonging to LFNs. This provides compatibility with older applications.

Figure 5:
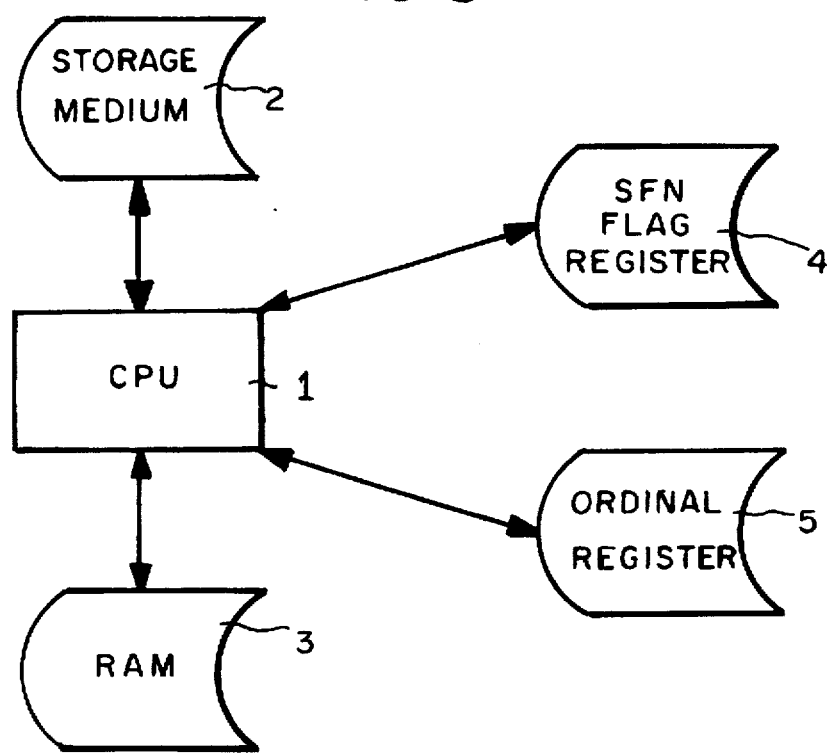
FIG. 5 is a simplified block diagram of computer apparatus embodying the present invention.

FIG. 5 illustrates the architecture of a typical computer system that can beneficially utilize the present invention. CPU 1 is the central processing unit of the computer, and may contain an embodiment of the process steps of the present invention in the form of a computer program. Alternatively, the process steps could be embodied in firmware or hardware. CPU 1 is coupled by bi-directional busses to storage medium 2, random access memory (RAM) 3, short filename (SFN) flag register 4, and ordinal register 5.

Storage medium 2 contains the directories that are to be examined by the present invention. RAM 3 is used by CPU 1 as a fast memory for temporarily storing the contents of the directory currently being examined. SFN flag register 4 is a register whose contents can be flagged (e.g., set to 1) to indicate the presence of an SFN. Ordinal register 5 is used to store the contents of the ordinal field (byte position 0) of an LFN entry.

Figure 6:
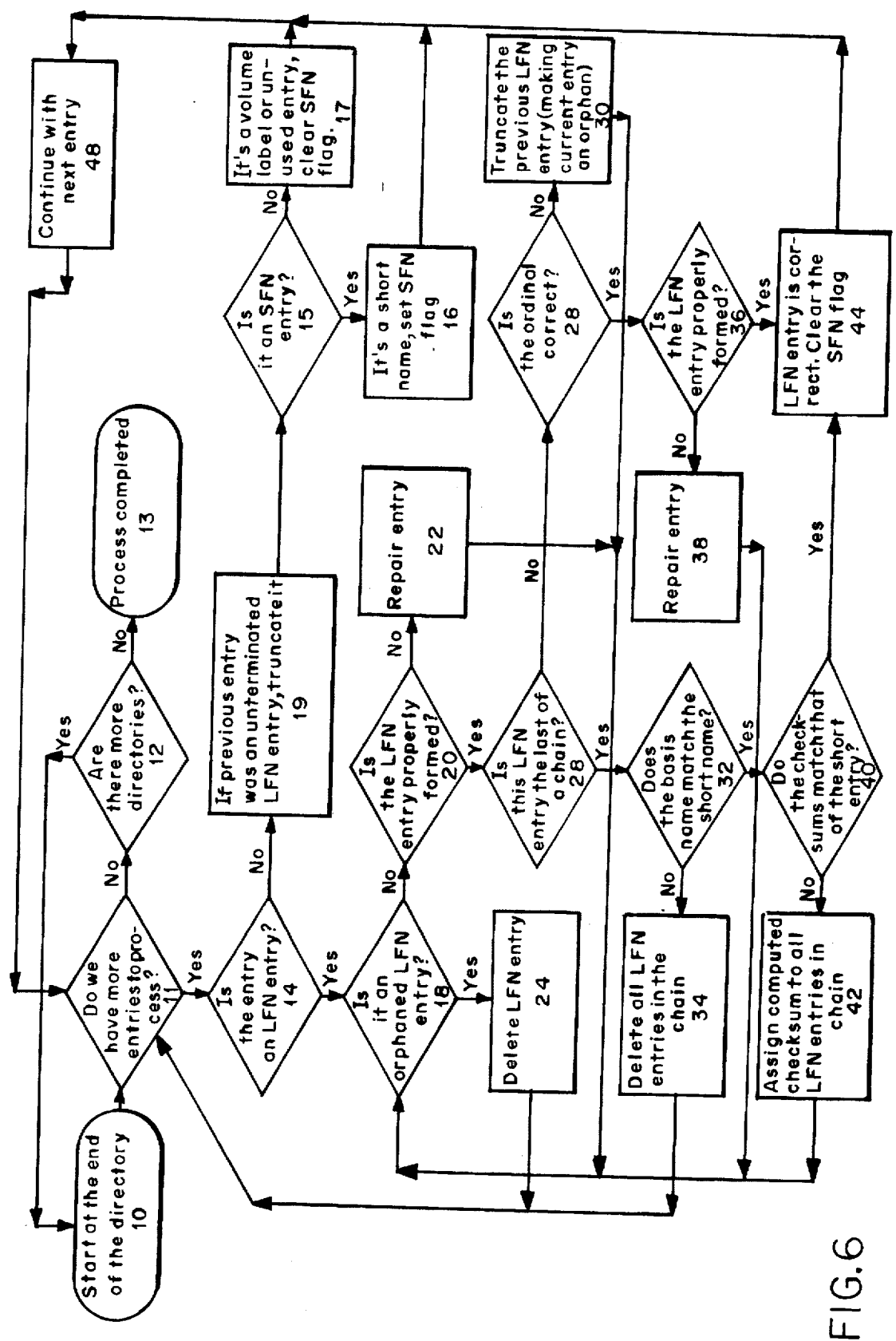
FIG. 6 is a flowchart diagram illustrating the process steps of the present invention.

The process of a preferred embodiment of the present invention will now be discussed in conjunction with the flowchart illustrated in FIG. 6.

The method starts at step 10, wherein a new directory is to be examined. The contents of ordinal register 5 are initialized to zero. Preferably, the directory is examined starting from its end (bottom), and individual directory entries are examined backwards through the directory. We know when we are at the end, because the first byte of the last entry in a directory is always zero. One reason for going through the directory backwards is that the determination as to whether an LFN entry is an orphan (step 18) is thereby made more efficient. However, it is possible to modify the method, by going through each directory in forward rather than reverse order.

At step 11, the method determines whether there are more directory entries in that particular directory to be processed. One could have a directory containing no entries; thus, this question is appropriate in all cases. If there are no more entries to be processed in the instant directory, optional step 12 is invoked. Step 12 determines whether there are more directories to be processed. If not, the process is completed (step 13). If there are more directories to be processed, step 10 is re-invoked. If the user wishes to check just one directory, optional step 12 is skipped and termination step 13 is entered directly.

If step 11 determines that there are more entries to be processed in the instant directory, step 14 is entered. Step 14 determines whether the entry currently being examined is an LFN entry. If so, step 18 is entered; if not, step 19 is entered. The determination as to whether the entry is an LFN entry is made by examining the attribute field, described above. If the entry is determined to be an LFN entry with an ordinal other than one, the ordinal field from the previous entry is stored into ordinal register 5 (see FIG. 5), then step 18 is entered. The reason for storing the ordinal field into ordinal register 5 is so that the decision made at step 28 will be correct (see below).

Step 19 determines whether the previous entry was an unterminated LFN entry. If so, said unterminated LFN is truncated. The purpose of this is to make sure that the chain of LFN entries associated with a given SFN is properly terminated. Truncation is defined as setting the seventh bit in the ordinal field to one, indicating that the LFN entry is the last LFN entry in the chain.

After step 19, control passes to step 15, where the method determines whether the present entry is an SFN entry. Note that for the purposes of this invention, a subdirectory label is the same as a file label, because each can have an SFN and an LFN. Also for the purposes of this invention, a directory is the same as a subdirectory, because they both have the same attributes.

If the current entry is determined by step 15 to be an SFN entry, step 16 is entered. Step 16 sets the SFN flag, e.g., by placing a 1 in SFN flag register 4 (see FIG. 5). The reason to set the SFN flag is so that the determination as to whether an entry is an orphaned LFN entry (step 18) will be made correctly. Step 16 also re-initializes register 5 to zero.

If step 15 determines that the current entry is not an SFN entry, then it is known that the current entry is a volume label or an unused entry. Step 17 therefore clears the SFN flag, e.g., by placing a zero in SFN flag register 4. The reason for clearing the SFN flag is so that step 18 does not make an erroneous orphan determination.

After step 16 or step 17 has been executed, the method examines the sequentially (backwards) next entry (step 46) and again inquires in step 11 as to whether said entry is in fact a directory entry, meaning that processing should continue.

Step 18 determines whether the LFN entry (determined to be such by step 14) is an orphaned LFN entry. The definition of an orphaned LFN entry is an LFN entry that is not properly associated with an SFN entry. An LFN entry cannot validly exist by itself. The criterion for declaring an LFN entry to be an orphaned LFN entry is that the SFN flag is not set, e.g., the contents of SFN flag register 4 are zero. This indicates that an SFN entry does not follow the LFN entry in the directory. If the LFN entry is determined to be an orphan, then step 24 remedies the problem by deleting the LFN entry, then passes control back to step 11 to continue with the next entry.

If step 18 has determined that the current entry is not an orphaned LFN entry, then step 20 is entered. Step 20 determines whether the current LFN entry has been properly formed. Typically, this is a three-part analysis. First, the cluster number (bytes 26 and 27) must be zero. Second, the type byte (byte 12) must be zero. Third, in order for the LFN entry to be properly formed, the bits within the filename character fields (bytes 1–10, 14–25, and 28–31) must constitute valid characters. Invalid characters are typically defined to include a null character (0000 hexadecimal) situated between valid characters, and a hexadecimal ffff situated between valid characters.

If step 20 determines that the LFN entry has not been properly formed, step 22 repairs the LFN entry, and then control is passed back to step 18 for revalidation. The repair performed by step 22 is a function of the defect in the LFN entry. Thus, if the cluster number is not zero, step 22 sets the cluster number to zero. If the type byte is not zero, step 22 sets the type byte to zero. If an invalid character is present within a filename character field, step 22 overrides the invalid character with a valid character (such as an underline).

If step 20 determines that the LFN entry has been properly formed, step 26 is then executed. Step 26 determines whether the LFN entry is the last LFN entry in a chain. This determination is made by looking at the ordinal field (byte position zero) of the LFN entry. If the seventh bit in the ordinal field is a one, then by definition, the LFN entry is the last in a chain, and control is passed to step 32. If not, control is passed to step 28, which determines whether the ordinal appearing in the ordinal field of the current LFN entry is correct. This decision is made by determining whether the ordinal is the sequentially next number compared with the ordinal that was stored in register 5 following the conclusion of step 14. If step 28 determines that the ordinal is not correct, then step 30 is entered. Step 30 truncates the previous LFN entry, making the current LFN entry an orphan. Control is then passed back to step 18. The newly-made orphan will then be deleted by step 18.

If step 28 determines that the ordinal is correct, optional step 36 is entered. Step 36 determines whether the LFN entry has been properly formed. This is typically the same determination that is made in step 20, and thus, step 36 can be considered a revalidation step. The purpose of step 36 is to make sure that whatever was repaired was repaired correctly; and if there was an incomplete repair, to give an opportunity for complete repair. If repairs need to be made, they are made by step 38 (which is the same as step 22), and control is then passed back to step 18. If no repairs need to be made, step 44 is entered, where the SFN flag is cleared, e.g., by placing a zero into register 4, so that the next time step 18 is executed, a correct determination can be made. Step 46, which moves the examination to the next entry, is then entered.

If step 26 determines that the current LFN entry is the last LFN entry in a chain, then step 32 is executed. Step 32 determines whether the basis name of the entire LFN matches the short name stored in the associated SFN entry. This determination is typically performed by using the same algorithm that the operating system uses to derive a short name from a long filename.

If step 32 determines that the basis name does not match the short name, then step 34 is executed. Step 34 normally deletes all of the LFN entries in the chain. This default remedy is undertaken because a basis name not matching the short name indicates a serious problem. Step 34 also clears the SFN flag. Control is then passed to step 11, where the next entry is examined. Alternatively, the method asks the user whether he or she wishes to keep the LFN attached to the SFN entry. In that case, the method overrides the short name field in the SFN entry with the basis name it has just computed from the LFN. Then, the method continues with step 40.

If step 32 determines that the basis name matches the short name, then step 40 is executed. Step 40 examines the checksums (byte 13) of all of the LFN entries in the chain. It compares these checksums one-by-one against a checksum that it calculates from the short name stored in the associated SFN entry. The calculation of the checksum is done the same way as the vendor of the operating system calculates checksums. It is of no import what this procedure actually is.

If step 40 determines that the checksums match, then it is deemed that the LFN entry is correct, and step 44 is executed, as described previously. If step 40 determines that the checksums do not match, then step 42 is executed. Step 42 assigns the checksum that was calculated by step 40 (based upon the short name) and places it in each of the LFN entries in the chain.

After step 42 has been executed, control is optionally passed back to step 18 for a revalidation. Alternatively, if it is not desired to take the additional time necessary to perform the revalidation, control could be passed to step 44.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. A computer-implemented method for diagnosing and repairing defective long filenames (LFNs), said method comprising the steps of:

providing at least one directory, wherein each directory may contain at least one entry representing a file;

assigning a short filename (SFN) to each file;

optionally assigning a long filename (LFN) to at least one of the files, wherein each LFN comprises at least one LFN entry;

diagnosing defective LFN entries; and repairing LFN entries that have been diagnosed as being defective.

2. The method of claim 1, wherein the defective LFN entries that are repaired are from the group comprising:

orphaned LFN entries;

malformed LFN entries;

improperly terminated chains of LFN entries; and improper matches between LFN entries and corresponding SFNS.

3. The method of claim 2, wherein the malformed LFN entries are from the group comprising:

LFN entries where the cluster number is non-zero;

LFN entries where the type byte is non-zero; and

LFN entries having filename character fields containing invalid characters.

4. The method of claim 3, wherein the malformed LFN entry has a non-zero cluster number, and the repairing step comprises setting the cluster number to zero.

5. The method of claim 3, wherein the malformed LFN entry has a non-zero type byte, and the repairing step comprises setting the type byte to zero.

6. The method of claim 3, wherein the malformed LFN entry has at least one filename character field containing at least one invalid character, and the repairing step comprises replacing the invalid characters with valid characters.

7. A computer-implemented method for diagnosing and repairing defective long filenames (LFNs) in a directory having at least one entry, said method comprising the steps of:

for each directory entry, determining whether the entry constitutes an LFN entry;

for each LFN entry, determining whether the LFN entry is orphaned;

for non-orphaned LFN entries, determining whether the LFN entry has been properly formed.

8. The method of claim 7, further comprising the steps of:

determining whether each LFN entry is the last entry in a chain of LFN entries;

for each last LFN entry in a chain, determining whether a basis name of the LFN entry matches a short filename (SFN) associated with the LFN entry; and for each instance where the basis name matches the SFN, determining whether checksums of all the LFN entries in the chain match a checksum calculated from the SFN.

9. The method of claim 7, wherein the entries within the directory are examined in reverse order.

10. A computer-implemented method for diagnosing and repairing defective long filenames (LFNs) in a directory containing lists of files, with a short filename (SFN) associated with each file, and an LFN optionally associated with at least one of the SFNS, said method comprising the steps of:

beginning the method at the end of the directory;

inquiring as to whether there are additional directory entries to process;

when there are additional entries to process, inquiring as to whether the present entry is an LFN entry;

when the entry is an LFN entry, determining whether the LFN entry is orphaned; and when the LFN entry is determined to be orphaned, deleting the LFN entry.

11. The method of claim 10, further comprising the steps of:

when the LFN entry is not determined to be orphaned, determining whether the LFN entry has been properly formed;

when the LFN entry is determined to have not been properly formed, repairing said entry;

when the LFN entry is determined to have been properly formed, determining whether the LFN entry is the last in a chain of LFN entries;

when the LFN entry is determined to be the last in a chain of LFN entries, determining whether a basis name of the LFN entry matches a short filename (SFN) associated with the LFN entry; and when the basis name matches the SFN, determining whether checksums of all the LFN entries in the chain match a checksum calculated from the SFN.

12. The method of claim 11, further comprising the steps of:

when the current LFN entry being examined is not the last LFN entry a chain, determining whether an ordinal of the LFN entry is correct;

when the ordinal of the current LFN entry is not correct, truncating the previous LFN entry, making the current LFN entry an orphan;

when the ordinal of the current LFN entry is correct, determining whether the current LFN entry has been properly formed;

when the current LFN entry is determined to have been improperly formed, repairing said current LFN entry; and when the current LFN entry is determined to have been properly formed, clearing an SFN flag.

13. Computer apparatus comprising:

a central processing unit (CPU);

coupled to the CPU, a storage medium containing at least one directory, wherein each directory may have at least one short filename (SFN) entry with a long filename (LFN) optionally associated therewith;

coupled to the CPU, a random-access memory;

coupled to the CPU, a register for storing an indication as to whether a directory entry being examined by the central processing unit is an SFN; and coupled to the CPU, a register for storing an ordinal field associated with each LFN.

14. A computer-readable medium containing a computer program that diagnoses and repairs defective long filenames (LFNs) in a computer directory containing at least one short filename (SFN) with at least one long filename (LFN) entry associated therewith, said computer program performing the steps of:

providing at least one directory, wherein each directory may contain at least one entry representing a file;

assigning a short filename (SFN) to each file;

optionally assigning a long filename (LFN) to at least one of the files, wherein each LFN comprises at least one LFN entry;

diagnosing defective LFN entries; and repairing LFN entries that have been diagnosed as being defective.

* * * * *